Sept. 21, 1954      G. F. D'ALELIO      2,689,801
METHODS OF PRODUCING COATED ARTICLES
Filed July 11, 1949
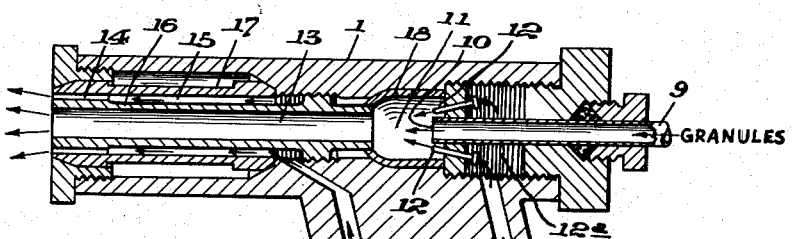
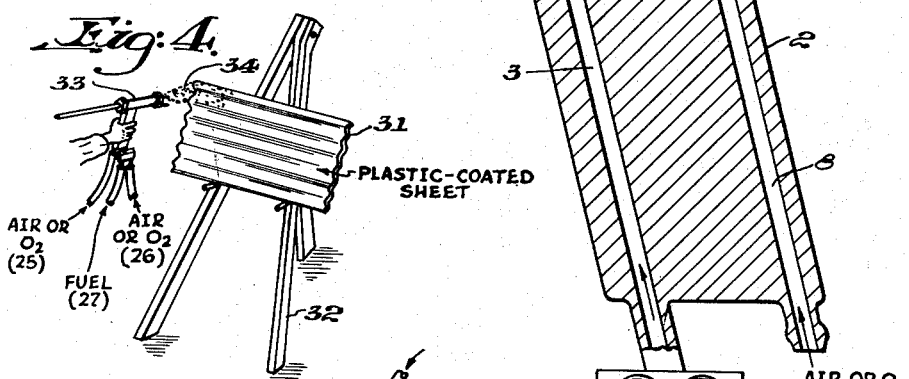
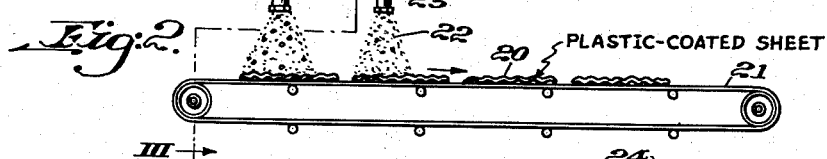
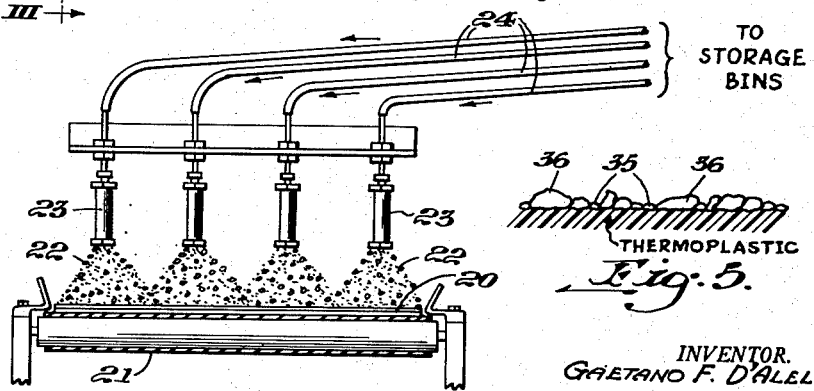
INVENTOR.
GAETANO F. D'ALELIO.
BY Frank H. Wisch.
his
ATTORNEY.

Patented Sept. 21, 1954

2,689,801

UNITED STATES PATENT OFFICE 2,689,801

METHODS OF PRODUCING COATED ARTICLES

Gaetano F. D'Alelio, Pittsburgh, Pa., assignor to Koppers Company, Inc., a corporation of Delaware Application July 11, 1949, Serial No. 104,106

7 Claims. (Cl. 117—9)

This invention relates to improvements in methods of producing articles covered with solid particulate material, and products obtained by such methods.

Numerous methods have been proposed by which granules or solid particulate materials are applied to surfaces for decorative or protective purposes. Ordinarily, an adhesive or binder is first applied to a surface to be coated, and while the adhesive or binder is still soft and sticky, granules are sprinkled thereon, whereafter the adhesive or binder is permitted to dry or harden. Also, it has been a practice to heat a thermoplastic surface to soften it and to apply granules to the softened surface.

A feature of the present invention, in which a thermoplastic surface is covered with solid particulate material, comprises applying solid particulate material by means of a conveying gas to a solid thermoplastic surface while heat is applied to the particulate material in suspension in such conveying gas. The thermoplastic is softened momentarily upon impingement of the heated particles on its surface. Particles of the particulate material adhere to the surface and are anchored in place upon rehardening of the thermoplastic. There are several advantages in this procedure, namely, it makes possible easier and quicker handling in commercial production; flow of the thermoplastic is prevented; and the thermoplastic more readily retains its original general form even on vertical surfaces. Furthermore, when the thermoplastic serves as a coating on a base, its attachment to the base is more strongly maintained by permitting the thermoplastic to retain its initially hardened state in contact with the base surface.

A further feature, in the present invention, comprises projecting heated particles of solid particulate material onto thermoplastic surfaces placed at any angle, in vertical as well as horizontal position, obtaining thereby a granule coated surface, the granules being uniformly distributed over an entire surface, or arranged in patterns or figures that can be of one solid color or variegated. Highly desirable effects are obtained by applying granules within certain preferred mesh ranges that can be variously colored, and also by the successive application of particulate material in which particles are of prescribed dimensions.

Products of outstanding appearance are obtained by the present method and are believed to be notably different from granule coated products obtained in the customary procedures.

The above indicated and other features of the invention and their attendant advantages are more fully described hereinbelow in preferred form and by way of illustration, with reference to the accompanying drawing in which—

Fig. 1 is a sectional view of a preferred type of apparatus for applying solid particulate material to thermoplastic surfaces;

Fig. 2 is a diagrammatic representation of a side elevational view of apparatus suitable for continuous, large-scale production of granule-surfaced articles, such as sheets employable for various purposes;

Fig. 3 is a view of apparatus shown in Fig. 2 taken on line 3—3;

Fig. 4 is a perspective view of apparatus for use in applying granules to a single sheet held in upright position, and illustrates the manipulation of the apparatus in Fig. 1 by hand; and Fig. 5 is an enlarged, diagrammatic, sectional view of a fragment of a granule-surfaced article that can be produced by the spraying process.

In the drawing, Fig. 1 illustrates the construction of a granule-applying device for use in heating and in distributing solid particulate material on a thermoplastic surface. The granule-applying device comprises a pistol-shaped means having a barrel section 1 and a handle 2. The handle 2 is provided with a passage 3 for heating fluid, such as a combustible mixture of air or oxygen and a hydrocarbon supplied from suitable sources through tubes 4 and 5 and control valves 6 and 7 respectively.

A passage 8 in the handle 2 serves for the delivery of air or oxygen under pressure to an aspirator unit at the rear end of the barrel section 1. The aspirator unit comprises a tube 9 that is connected to any suitable supply means, such as a hopper (not shown), for granules, and having an open end 10 positioned in an aspirating chamber 11. The air or oxygen from the passage 8 flows into the space 12a and is then forced through open-ended nozzles 12 which are arranged concentrically around the tube 9. The nozzles 12 direct the air or oxygen across the open end 10 of the tube 9. The granules are thus drawn into and ejected at high velocity from the chamber 11 through a central bore 13, and thereafter are projected through an annular flame of burning gases emitted from annular orifice 14.

Gases for producing the flame are conducted from the passage 3 to the orifice 14, through an annular space 15 between concentric sleeves 16 and 17.

To reduce erosion due to the movement of granules, the chamber 11 and bore 13 are provided with an abrasion-resistant inner surface. The tube 9, the sleeve 16, and the lining 18 of chamber 11, which are replaceable, can be made entirely of abrasion-resistant metal or other material.

The solid particulate material employed in the present process for coating a thermoplastic surface has one or more of the following properties, and preferably all combined, particularly for outdoor exposure: relatively non-fusible, incombustible, insoluble in water and other solvents, and inert with respect to combustion gases or the atmosphere to which the surface is to be exposed, or to the thermoplastic itself. The particles should at least be unaffected physically or chemically by the flame of the granule-applying device unless certain changes are thereby desirable for decorative or other purposes. In view of the high velocity of the particles through the flame, though the composition of certain particles may be fusible, if allowed to reach the actual temperature of the flame, they will not fuse, but they are heated to sufficiently high temperatures for the present process.

Examples of particulate material include slate, greenstone, sand, chert, flint, glass, limestone, feldspar, slag, shale, crushed brick and tile, mica, talc, various metals and abrasive dusts. Natural granules, synthetic granules or mixtures of granules of different compositions and colors, or artificially colored granules may be used to produce solid colored or vari-colored granule-surfaced articles. The particles may have surfaces which have any one or more of the following characteristics: curved, shell-like, flat, approximately smooth, even planes, very uneven, rough, or irregular.

Particulate or granule materials in which the bulk or major portion of the particles have a grain size of from approximately 40 to approximately 100 mesh are most satisfactory in the present process. In the use of larger particles, the application is slower, and adhesion is apt to be poorer. Smaller particles of uniform size may be employed but coverage is not as good, and a dust disturbance is apt to result. Particulate materials, in which the granules are of varying size in the above range, have excellent coverage power. Fines smaller than 100 mesh are preferably removed since they tend to drift out of the trajectory of the conveying gases and to coat adjacent areas of the thermoplastic surface first and thus later interfere with the adhesion of the larger particles to the dusted surface. A highly desirable granule-covered surface is obtained by successive applications in which larger particles of a given size are applied first, and thereafter in one or more additional applications the particles are successively smaller. Practically complete coverage is thus obtained, in which the particles are densely packed on the thermoplastic surface and adhere strongly thereto.

Particulate materials having, for example, the following screen analyses show highly desirable results:

| Mesh | 20 | 40 | 60 | 80 | 100 | 200 | Fines | Total |
|---|---|---|---|---|---|---|---|---|
| Percent retained on screens | 1.0 | 89.1 | 9.3 | 0.3 | 0.0 | 0.0 | 0.3 | 100.0 |
| | 1.6 | 53.7 | 36.8 | 3.7 | 0.7 | 1.1 | 2.4 | 100.0 |
| | 1.1 | 61.8 | 28.0 | 4.1 | 0.9 | 1.1 | 3.0 | 100.0 |
| | 2.2 | 69.7 | 20.9 | 3.7 | 1.0 | 1.1 | 1.4 | 100.0 |
| | 2.0 | 86.1 | 10.3 | 1.2 | 0.4 | trace | 0.0 | 100.0 |

Various combinations of fluid fuel, and oxygen or air, or both oxygen and air, may be employed for producing the flame for heating the particulate material. A high temperature flame is not necessary. A flame that is sharp and stable, and adjustable to within about six inches of the annular orifice 14 is preferred. Adjustment of the length of the flame may be made so as to extend it along the path of the conveyed granules a longer or shorter distance. A suitable flame may be produced, for instance, with natural gas at about 17 pounds pressure, and oxygen at about 30 pounds pressure.

Suitable pressure gauges (not shown) may be provided for each of the fluids used in the granule-applying device.

Articles to which the heated granular spray may be applied may be of various shapes and entirely constructed of thermoplastic material, or they may be constructed of metal, stone, or wood or other fibrous material having an outer coating of thermoplastic material to which the granules are to be applied. Some thermoplastics suitable for the process, are for example, various bitumens including asphalts, pitches; and synthetic resins, for example, those polymers generally known as condensation polymers, such as, polyesters, polyamides, and the like, representative examples of which are the nylons as well as those polymers known as addition polymers, such as the vinyl polymers of which typical examples are the polymers and co-polymers of vinyl chloride, vinyl acetate, ethylene, methacrylic esters, acrylic esters, etc.

The thermoplastic surface remains substantially unheated by the flame from the granule-applying device or, at least, its temperature is not raised to a point where the thermoplastic is likely to flow on vertical surfaces. The thermoplastic is softened momentarily by each particle upon impingement in consequence of its temperature and velocity. In other words, local plastic flow of the solid thermoplastic adjacent the point of impact of each impinging particle in a suspension is effected by the velocity of impact of a heated particle in the flowing suspension. On cooling of the particle, the thermoplastic adjacent the particle surface rehardens and fastens the particle in place.

The present process has been highly successfully applied to the granule coating of metal sheets predipped in bituminous coating material for use in siding and roofing for buildings. A bituminous material of considerable merit for this purpose is a so-called coal-digestion pitch having softening-point and penetration characteristics which prevent flow of the pitch on vertical surfaces at highest atmospheric temperatures and prevent brittling at lowest atmospheric temperatures, as for instance having in combination a softening point in a range above approximately 95° C., or about 95° C. to about 150° C., a penetration at 32° F. with 200 grams for 60 seconds of above or at least 10, and a penetration at 115° F. with 50 grams for 5 seconds of not more than about 85.

A preferred composition of the above pitch comprises a heavy hydrocarbon oil in uniform admixture with thermally decomposed bituminous coal and heat-liquefiable bitumen, the mixture having the above softening point and penetration characteristics. An example of such a composition is described and claimed in U. S. Patent No. 2,395,041 to W. F. Fair, Jr. Such pitch is used in a hot dipping process for providing a coating of uniform thickness on metal sheets as described and claimed in a copending application of W. F. Fair, Jr., Serial No. 783,128, filed October 30, 1947. The coating is permitted to harden on the metal surface before subjecting it to the process of the present invention.

Reference is made to Figs. 2 and 3 in which apparatus is diagrammatically shown to illustrate a continuous method of coating articles with solid particulate material. Articles, such as corrugated metal sheets 20 coated with a cold or hardened thermoplastic, such as those mentioned above, are placed on an endless belt 21. This belt carries the coated sheets 20 horizontally in the direction of the arrow, through suspensions of heated particles 22 of the desired particulate material so that the exposed thermoplastic surface is preferably uniformly covered with such particles.

In the coating of sheets by means of the apparatus shown in Figs. 2 and 3, granule-applying devices 23 of the type shown in Fig. 1, are positioned above the belt 21 to direct the particulate material downwardly upon a sheet surface. Each device 23 is provided with a tube 24 corresponding to the tube 9 (Fig. 1) for feeding particulate material to the device from storage bins (not shown). A tube 25 for aspirating air or oxygen, and tubes 26 and 27, respectively, for air or oxygen and fuel for the flame, are also connected to each device 23. One such device, or a plurality of such devices in a bank may be used, depending on the width of a sheet. The vertical distance between the nozzle of a device 23 and the surface of a sheet 20 is adjustable, and so is the spread of the granules from each device. For substantially complete coverage, the devices 23 in a bank are so spaced that no gap occurs in the granule coating as the sheets 20 are moved along. The zones reached by the particles in the suspension from one device and from a device next adjacent thereto in a bank may, if desired, be slightly overlapping.

The speed at which the belt 21 carries the articles through a suspension of particles depends on several factors including the nature of the particles and of the thermoplastic, the temperature to which the particles are heated and the force with which they are applied. In treating metal sheets coated with coal-digestion pitch, speeds up to a maximum of about 18 lineal feet per minute have been satisfactorily employed. By the time the sheets reach the end of the belt 21, the particles become firmly set in the thermoplastic. If both sides are to be covered, the sheets are turned over and consecutively passed through the suspensions again.

Successive applications of particulate material of different mesh, as for instance, an application of material of larger particle size followed by particulate material of smaller particle size, may be accomplished with one granule-applying device or with a plurality of such devices. One bank of devices 23 may be used for such successive applications, or a plurality of spaced banks may be placed parallel to each other above the belt 21. For illustration, a second bank may be in line with a granule-applying device 30 shown in part in Fig. 2. The number of banks of granule-applying devices will depend on the number of different mesh particulate material to be separately and successively applied. The first bank of granule-applying devices that is approached by a sheet on the belt 21, applies the larger particles, the next bank particles of smaller size and so on, so that the smallest particles are applied by the final bank.

Under certain conditions, in an arrangement such as that shown in Figs. 2 and 3, the fuel for heating the conveyed particles in suspension can be burned prior to its use in a granule-applying device and instead, the resultant hot products of combustion are fed through tube 27 to heat the particles passing through and ejected from the barrel section. If desired, the hot combustion gases are also introduced in place of air or oxygen through the tube 25 into the aspirating means in the device 23. In this case, the use of tubes 26 and 27 may be alternatively eliminated. Though hot combustion gases are, in certain respects, more advantageously applied, hot gaseous fluid obtained otherwise than by combustion may be used for aspirating, and for heating and conveying the granules.

For piecework or for hand spraying, a sheet 31 pre-coated with thermoplastic may be placed in upright position on an easel 32, and a granule-applying device 33 such as that shown in Fig. 1 may be used to cover the thermoplastic coat with granules 34.

As indicated above, novel products with novel surface appearance are obtained by the process of the present invention. As illustrated in an enlarged section in Fig. 5, an article is produced on the surface of which particulate material can be densely packed. The surfaces of particles are brought tightly together so that complete coverage can be accomplished. The smaller sized particles 35 fill spaces between the larger sized particles 36 so that there are few, if any, voids and so that the thermoplastic is not visible. The particles are held rigidly in place whether flat or rounded sides or sharp edges thereof contact the thermoplastic.

What is claimed is:

1. In a method providing a covering of solid particulate material on a thermoplastic surface, projecting heated solid particulate material in successive applications onto said surface over the same area to cause the particles upon impingement on the said surface in each application to fuse exposed thermoplastic in said area momentarily and locally adjacent points of impact of the particles, the pressure at which the particles contact the thermoplastic surface being sufficient to cause the heated particles to adhere to the exposed thermoplastic to which the particles in each application are applied, and the particle size of particulate material in a succeeding application being smaller than the particle size of particulate material in a preceding application, to cover exposed portions of said surface with said articulate material.

2. In a method providing a covering of solid particulate material on a thermoplastic surface, projecting heated solid particulate material in successive applications onto said surface over the same area to cause the particles upon impingement on the said surface in each application to fuse exposed thermoplastic in said area momentarily and locally adjacent points of impact of the particles, the pressure at which the particles contact the thermoplastic surface being sufficient to cause the heated particles to adhere to the exposed thermoplastic to which the particles in each application are applied, and the particle size of particulate material in a succeeding application being smaller than the particle size of particulate material in a preceding application, and the particle size of particulate material in each application being in the approximate range of 40 to 100 mesh, to cover exposed portions of said surface with said particulate material.

3. In a method providing a covering of solid particulate material on a thermoplastic surface, while projecting by means of a conveying gas solid particulate material in suspension in said gas in successive applications onto said thermoplastic surface over the same area, heating said particulate material above the softening point of the thermoplastic to cause the particles of said material upon impingement on the said surface in each application to use exposed thermoplastic in said area momentarily and locally adjacent points of impact of the particles and thereafter to become adhesively attached to said surface upon hardening of said thermoplastic, the pressure at which the particles contact the thermoplastic surface being sufficient to cause the heated particles to adhere to the exposed thermoplastic to which the particles in each application are applied, and the particle size of particulate material in a succeeding application being smaller than the particle size of particulate material in a preceding application, and the particle size of particulate material in each application being in the approximate range of 40 to 100 mesh.

4. In a method of covering articles having a thermoplastic surface by passing said articles through suspended solid particulate material in a conveying gaseous fluid, passing an area of an exposed thermoplastic surface of an article successively through a plurality of suspensions of heated solid particulate material in said gaseous fluid, the pressure at which the particles contact the thermoplastic surface being sufficient to cause the heated particles to adhere to the exposed thermoplastic to which the particles in each application are applied, and the particle size of said particulate material in a succeeding suspension being smaller than the particle size of particulate material in a preceding suspension, to cover said area of said surface with said particulate material.

5. In providing a covering of solid particulate material on a solid thermoplastic surface fusible in a range above highest atmospheric temperatures and below flame temperatures, the method comprising, while said thermoplastic surface is in a hardened, non-flowing state, delivering onto said surface with impact in a conveying gaseous stream under pressure a suspension of heated solid particulate material at a temperature in the above range and at a velocity to effect a momentary local plastic flow of the thermoplast at the points of impact of particles of said suspension, the pressure at which the particles contact the thermoplastic surface being sufficient to cause the heated particles to adhere to the exposed thermoplastic to which they are applied, thereby attaching said particles to said surface upon rehardening of the thermoplast at said points.

6. In providing a covering of solid particulate material on a solid thermoplastic surface fusible in a range above highest atmospheric temperatures and below flame temperatures, the method comprising, while said thermoplastic surface is in a hardened, non-flowing state, projecting onto said surface with impact in a conveying gaseous stream under pressure a suspension of heated solid particulate material at a temperature substantially equivalent to that to which said particles are heated in projecting said suspension through a flame, to effect a momentary local plastic flow of the thermoplast at the points of impact of particles of said suspension, the pressure at which the particles contact the thermoplastic surface being sufficient to cause the heated particles to adhere to the exposed thermoplastic to which they are applied, thereby attaching said particles to said surface upon rehardening of the thermoplast at said points.

7. In providing a covering of solid particulate material on a solid thermoplastic surface fusible in a range above highest atmospheric temperatures and below flame temperatures, the method comprising, while said thermoplastic surface is in a hardened, non-flowing state, projecting particles of said solid particulate material of substantially 40 to substantially 100 mesh through a flame onto said surface to effect a momentary local plastic flow of the thermoplast at the points of impact of said particles, the pressure at which the particles contact the thermoplastic surface being sufficient to cause the heated particles to adhere to the exposed thermoplastic to which they are applied, thereby attaching said particles to said surface upon rehardening of the thermoplast at said points.

References Cited in the file of this patent

UNITED STATES PATENTS

| Number | Name | Date |
| --- | --- | --- |
| 1,943,085 | Muller et al. | Jan. 9, 1934 |
| 1,969,074 | Harshberger | Aug. 7, 1934 |
| 2,104,384 | Harris | Jan. 4, 1938 |
| 2,137,442 | Callan | Nov. 22, 1938 |
| 2,173,484 | Lerch et al. | Sept. 19, 1939 |
| 2,228,877 | Howell | Jan. 14, 1941 |
| 2,237,288 | Bode | Apr. 8, 1941 |
| 2,314,329 | Ericson | Mar. 23, 1943 |
| 2,458,143 | Burns et al. | Jan. 4, 1949 |